United States Patent
Borders et al.

(10) Patent No.: US 7,423,789 B2
(45) Date of Patent: Sep. 9, 2008

(54) CONTAMINANT PARTICLE IDENTIFICATION AND COMPENSATION WITH MULTICHANNEL INFORMATION DURING SCANNER CALIBRATION

(75) Inventors: Jesse R. Borders, Lexington, KY (US); Chengwu Cui, Lexington, KY (US); Larry L Kiser, Scottsville, NY (US)

(73) Assignee: Lexmark International, Inc., Lexington, KY (US)

( * ) Notice: Subject to any disclaimer, the term of this patent is extended or adjusted under 35 U.S.C. 154(b) by 258 days.

(21) Appl. No.: 11/217,744

(22) Filed: Sep. 1, 2005

(65) Prior Publication Data
US 2007/0047016 A1 Mar. 1, 2007

(51) Int. Cl.
H04N 1/00 (2006.01)
H04N 1/46 (2006.01)
G06K 9/38 (2006.01)
G06K 9/40 (2006.01)

(52) U.S. Cl. .................. 358/504; 358/406; 382/272; 382/275; 382/270

(58) Field of Classification Search .............. 358/504, 358/406; 382/272, 275
See application file for complete search history.

(56) References Cited

U.S. PATENT DOCUMENTS

| | | | | |
|---|---|---|---|---|
| 4,605,970 A | * | 8/1986 | Hawkins | 358/406 |
| 5,963,661 A | * | 10/1999 | Kato et al. | 382/149 |
| 6,442,497 B1 | * | 8/2002 | Houston et al. | 702/107 |
| 6,618,173 B1 | * | 9/2003 | Nobel et al. | 358/513 |
| 6,822,766 B2 | * | 11/2004 | Hill et al. | 358/474 |

* cited by examiner

*Primary Examiner*—Twyler L. Haskins
*Assistant Examiner*—Fred Guillermety

(57) ABSTRACT

Methods of identifying the location and dimensions of a contaminant particle on a calibration strip comprise imaging a calibration strip comprising a plurality of channels and a plurality of pixel columns. The method also includes generating a normalized local average pixel intensity value and locating a contaminant particle in a pixel column by comparing the intensity of an individual pixel in the pixel column to the normalized local average pixel intensity value. An intensity value of an individual pixel less than a predefined limit set below the normalized local average pixel intensity value corresponds to a location of a contaminant particle. The method further includes identifying the number of adjacent pixels in a pixel column less than a predefined limit set below the normalized local average pixel intensity value.

21 Claims, 2 Drawing Sheets

CONTAMINANT PARTICLE IDENTIFICATION AND COMPENSATION WITH MULTICHANNEL INFORMATION DURING SCANNER CALIBRATION

FIELD OF THE INVENTION

This invention relates to scanner calibration, and particularly to methods of identifying the location and/or dimensions of a contaminant particle on a calibration strip and compensating for contaminant particles during scanner calibration.

BACKGROUND OF THE INVENTION

Scanner calibration is a well-established process directed to reducing the defects resulting from illumination and sensor array sensitivity non-uniformity. Typically, a scanner is calibrated to a white surface, often referred to as a calibration strip. In some scanners, such as in a typical flatbed scanner configuration, the effect of contaminant particles, such as dust and debris, on the calibration strip is insignificant. A moving scan-head will move across the calibration strip to read an area of the surface, for example, for a total of 256 lines. Scanned data are then averaged by column and used to adjust the system responses.

However, in some scanner configurations, such as a sheet fed automatic document feeder configuration, where neither the scan-head nor the calibration strip can be moved, only one position on the calibration strip typically can be read. Small particles such as dust and debris may contribute significantly since the scan line width is comparable to the pixel width. Any dust or debris on that line may be falsely considered as a sensitivity weakness, and the gain factor may be falsely exaggerated. Such errors will be shown as bright vertical streaks on the scanned images.

To prevent streaking caused by small particle contamination, scanners should compensate for the contaminant particle. One contamination compensation approach employs software detection of improbable sudden changes in system sensitivity to conclude the existence of small particles. Upon detecting the particles, the sensitivity values at these locations are discarded and replaced with surrounding valid pixels. Under this approach, the assumption is that the sensor sensitivity non-uniformity is usually minimal and can be set to a limit, e.g. 20%. Streaking may still occur even at these low sensitivity values.

As demand increases for improved scanner resolution and clarity, the need arises for improvements in components and methods relating to scanner calibration, particularly in identifying the location and dimensions of contaminant particles on a calibration strip and compensating for these contaminant particles during scanner calibration.

SUMMARY OF THE INVENTION

According to a first embodiment of the present invention, a method of identifying the location and dimensions of a contaminant particle on a calibration strip is provided. A method comprises imaging a calibration strip comprising a plurality of channels arranged in rows and a plurality of pixel columns, wherein each channel comprises a plurality of horizontally adjacent pixels, and each pixel column comprises pixels from a plurality of channels, and also comprises generating a normalized local average pixel intensity value. The method further comprises locating a contaminant particle in a pixel column by comparing the pixel intensity value of an individual pixel in the pixel column to the normalized local average pixel intensity value, wherein an individual pixel intensity value less than a predefined limit set below the normalized local average pixel intensity value corresponds to a location of a contaminant particle. The method also comprises identifying the number of adjacent pixels in a column having a pixel intensity value less than the predefined limit set below the normalized local average pixel intensity value.

According to a second embodiment of the present invention, a method of compensating for contaminant particles when collecting calibration data on a calibration strip is provided. The method comprises identifying the location and dimensions of a contaminant particle on the calibration strip, wherein the location of the contaminant particle corresponds to a pixel intensity value less than a predefined limit set below a normalized local average pixel intensity value. The method further comprises excluding from the calibration data, pixel intensity values corresponding to contaminant particle locations and replacing excluded pixel intensity values in the calibration data with interpolated values, wherein the interpolated values are generated by interpolating between pixel intensity values adjacent to the excluded pixel intensity values.

The methods of the present invention provide improvements and advantages in scanner quality and resolution, for example, by providing improvement in scanner calibration. These and additional objects and advantages provided by the methods of the present invention will be more fully understood in view of the following detailed description.

BRIEF DESCRIPTION OF THE DRAWINGS

The following detailed description of specific embodiments of the present invention can be best understood when read in conjunction with the following drawings, where like structure is indicated with like reference numerals and in which.

DETAILED DESCRIPTION

The present invention relates to methods of utilizing multichannel information to identify the location and dimensions of contaminant particles and further relates to methods of compensating for the contaminant particles during scanner calibration to eliminate streaking artifacts. The methods may comprise imaging a calibration strip comprising a plurality of channels arranged in rows and a plurality of pixel columns, wherein each channel comprises a plurality of horizontally adjacent pixels, and each pixel column comprises pixels from a plurality of channels. The imaging may produce calibration data. The methods may also include generating a normalized local average pixel intensity value and locating a contaminant particle in a pixel column by comparing the pixel intensity value of an individual pixel in the pixel column to the normalized local average pixel intensity value. An individual pixel intensity value less than a predefined limit set below the normalized local average pixel intensity value corresponds to a location of a contaminant particle. In additional embodiments, the method may further comprise identifying the number of adjacent pixels in a pixel column having a pixel intensity value less than a predefined limit set below a normalized local average pixel intensity value and optionally calculating the dimensions of a contaminant particle based on this identification. Upon identifying the location and dimensions of a contaminant particle, the methods may comprise excluding from the calibration data all pixel intensity values at least partially covered by the contaminant particle, and replacing the excluded pixel intensity values in the calibration data with interpolated values, wherein the interpolated values are generated by interpolating between pixel intensity values adjacent to the excluded pixel intensity values.

Figure 1:
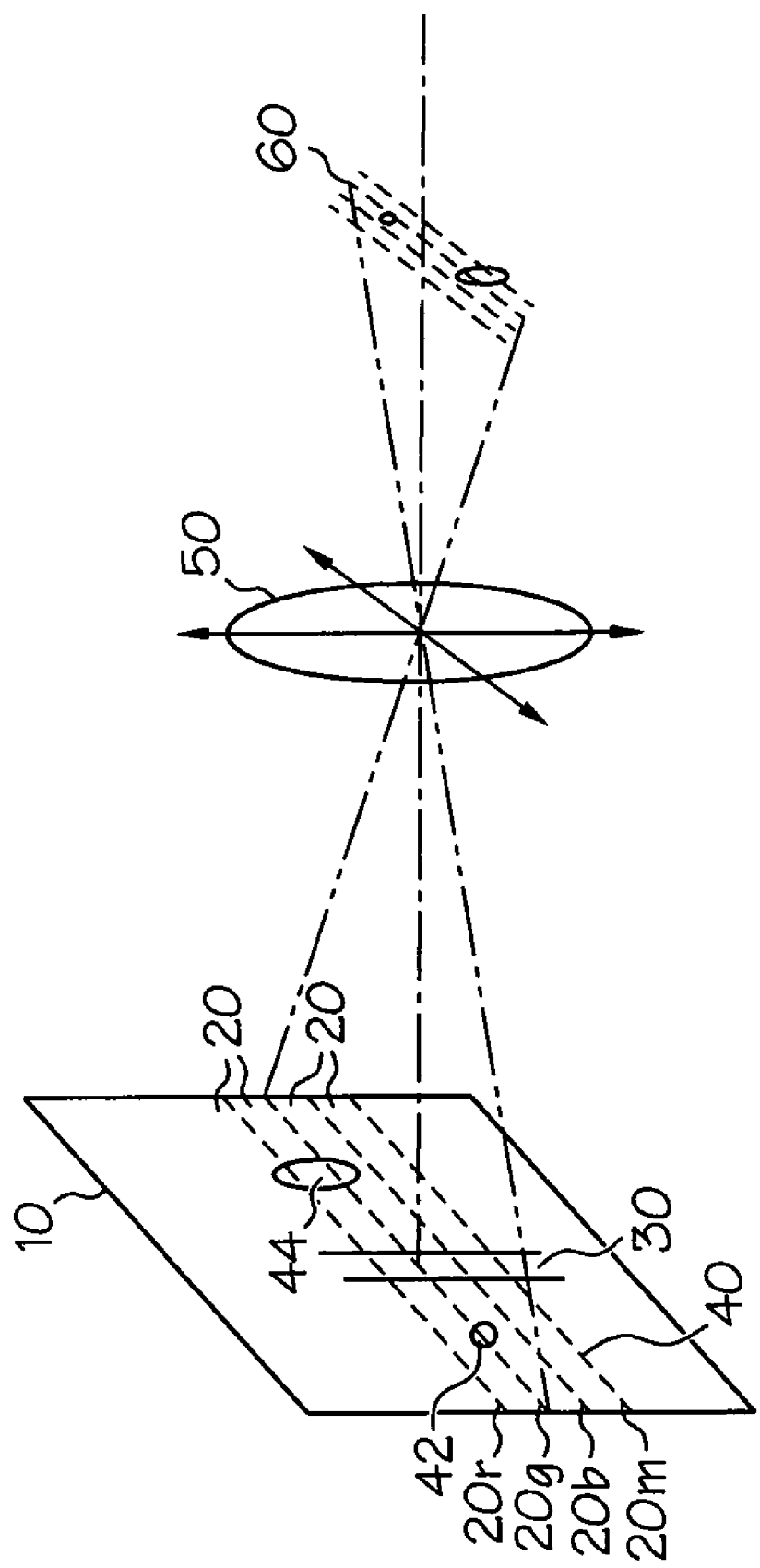
FIG. 1 is a schematic view illustrating the imaging of a multichannel calibration strip onto a sensor plane, according to one or more embodiments of the present invention.
Figure 2:
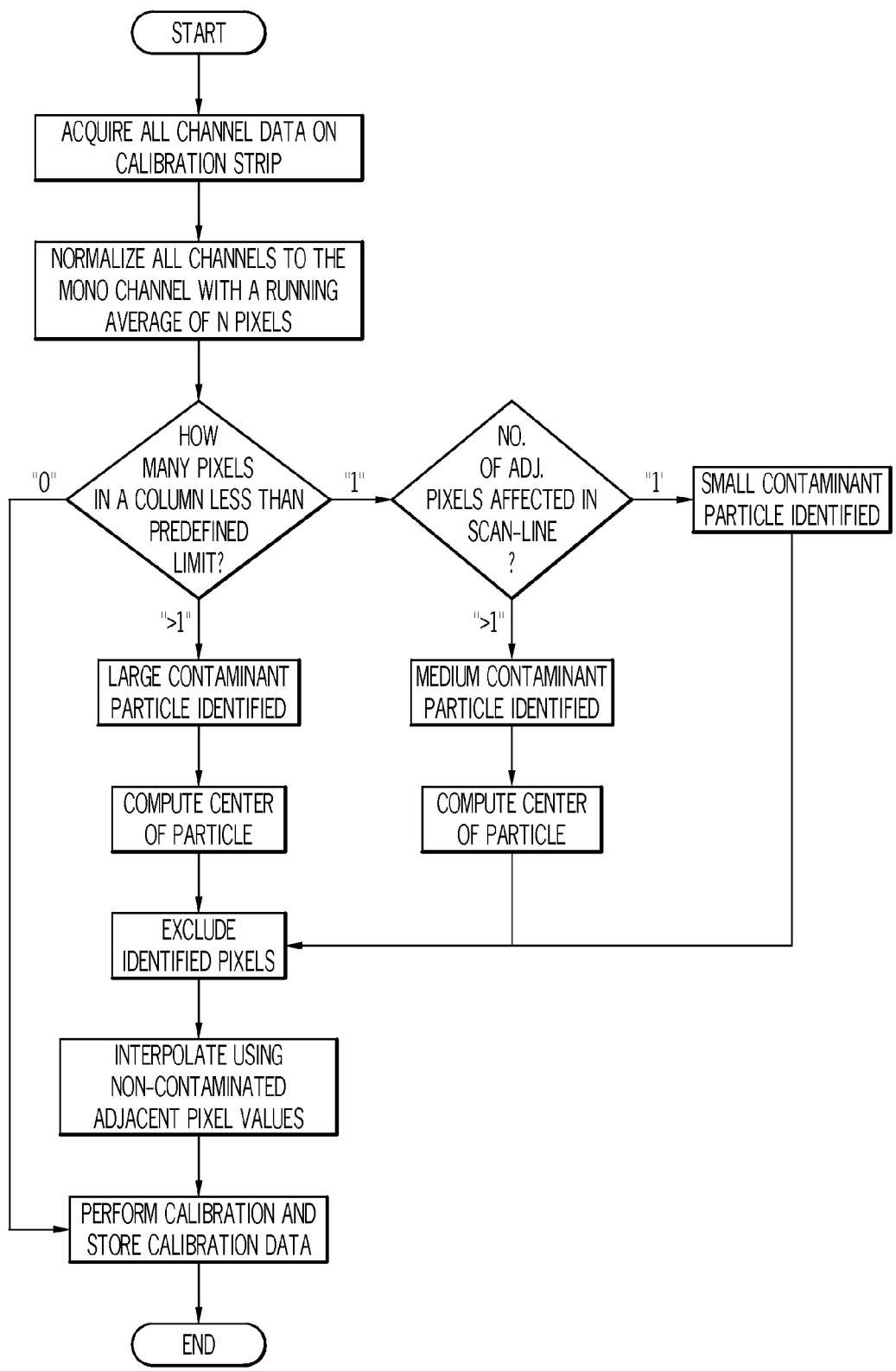
FIG. 2 is a flow chart illustrating methods of identifying the location and dimension of contaminant particles on a calibration strip and of compensating for the contaminant particle during scanner calibration.

Referring to FIGS. 1 and 2, one embodiment of a method of identifying the dimension and location of a contaminant particle on a calibration strip 10 is described. The method comprises imaging a calibration strip 10 comprising a plurality of channels 20 arranged in rows and a plurality of pixel columns 30, wherein each channel 20 comprises a plurality of horizontally adjacent pixels 40, and each pixel column 30 comprises pixels 40 from a plurality of channels. The method further comprises generating a normalized local average pixel intensity value by normalizing the channels 20 and locating a contaminant particle in a pixel column 30 by comparing the pixel intensity value of an individual pixel in the pixel column 30 to the normalized local average pixel intensity value, wherein an individual pixel intensity value less than a predefined limit set below the normalized local average pixel intensity value corresponds to a location of a contaminant particle. Moreover, the method comprises identifying the number of adjacent pixels in a pixel column 30 having pixel intensity values less than a predefined limit set below the normalized local average pixel intensity value.

In a further embodiment as shown in FIG. 1, the channels 20 comprise a plurality of channels, for example, red channels 20r, green channels 20g and blue channels 20b. In a further embodiment, the channels 20 may comprise a monochromatic (mono) channel 20m. Many modern scanners now incorporate three color channels and the mono channel. As stated above, scanner configurations, such as sheet fed automatic document scanners, read only one scan line; however, due to the spatial separation between channels 20 in this multichannel embodiment, the scanner essentially covers an area represented by four scan lines or channels 20 instead of one scan line. These multiple channels 20 provide additional information operable in detecting the location and optionally the dimension of contaminant particles on a calibration strip 10.

Imaging of a calibration strip 10 to obtain calibration data, as illustrated in FIG. 1, may include illuminating the calibration strip 10 and subsequently mirroring any images on the calibration strip 10 via a scanning lens 50 to a sensor plane 60. Thus, any contaminant particles 42 and 44 present on the calibration strip 10 will also be present on the image delivered to the sensor plane 60. As shown in FIG. 1, contaminant particles may be imaged, at least partially, by multiple pixels in the sensor array as in contaminant particle 44 or one pixel as in contaminant particle 42.

Referring to FIG. 2, the channels 20 may be normalized to generate a normalized local average pixel intensity value, after the scanned image data, referred to as the calibration data, has been acquired from the calibration strip 10. Pixels with pixel intensity values less than a predefined limit set below the normalized local average pixel intensity value constitute contaminant particles. In a further embodiment, the normalized local average pixel intensity value varies depending on the location of the calibration strip. Optionally, all channels 20 are normalized to the pixel intensity values of the mono channel. To obtain the normalized pixel intensity value of a local region of a specific channel, the average intensity value of that specific region consisting of a predefined number of pixels (e.g. 20) is first computed and used to divide the intensity of each pixel in that region of that channel. The normalized local average pixel intensity value is computed by taking the average of the normalized pixel intensity values of a predefined number of pixels (e.g. 10). The predefined limits constitute an acceptable range below the normalized local average pixel intensity value. If a pixel has a pixel intensity value below this range, it constitutes a contaminant particle and should be excluded from the calibration. Predefined limits may be set to any suitable value known to one skilled in the art. In one embodiment, a predefined limit may equal a percentage of the normalized local average pixel intensity value. For example, if a normalized local average pixel intensity value for a region is determined to be 200, a predefined limit may be set to 25% below the normalized local average pixel intensity value. Thus, the limit will be set at a value of 150. (150=200−25% (200)). As a result, any pixel intensity value below 150 corresponds to a contaminant particle.

In accordance with the present invention, locating contaminant particles in a pixel column 30 and identifying the number of adjacent pixels in a column 30 may reduce streaks during scanning. Typically, in prior art methods, when a contaminant particle only slightly touches a pixel 40, the drop of response of that pixel may be only slight. Therefore it may be falsely regarded as a sensor nonuniformity and cause an inaccurate correction. The pixel values will be further used to correct the identified pixels. Consequently, a modest level of light streaking may be present. The method of the present invention detects and identifies contaminant particles based on multi-channel sensor readings, thus enabling the detection of substantially blocked pixels and slightly affected adjacent pixels. After detection, a method of the present invention may compensate for the contaminant particles by excluding the values in the calibration data and/or replacing the excluded values with interpolated values.

In a further embodiment of the present invention as shown in FIGS. 1 and 2, a method of calculating the dimensions of a contaminant particle on a calibration strip 10 is provided. As described above, the method comprises imaging a calibration strip 10 having a plurality of channels 20 arranged in rows and a plurality of pixel columns 30, wherein each channel 20 comprises a plurality of horizontally adjacent pixels, and each pixel column 30 comprises pixels 40 from a plurality of channels 20. In this embodiment an average pixel intensity value is generated by normalizing the channels 20 and subsequently calculating the dimensions of a contaminant particle by identifying the number of adjacent pixels 40 in a pixel column 30 less than a predefined limit set below the normalized local average pixel intensity value.

In order to detect contaminant particles, the pixels 40 are searched first by pixel column 30. If no pixels in a pixel column 30 have a pixel intensity value less than a predefined limit set below the normalized local average pixel intensity value, then the pixel column deemed not to contain contaminant particles. As a result, calibration is conducted and data stored. If more than one adjacent pixel in a pixel column 30 has a pixel intensity value less than the predefined limit, then the particle is considered to be a large contaminant particle 44, as shown in FIG. 1. If only one pixel having a pixel intensity value less than a predefined limit set below the normalized local average pixel intensity value is detected, then the particle 42 is considered either a small or medium contaminant particle. In a further embodiment, the number of pixels adjacent to the one pixel in the channel 20 which have pixel intensity values less than a predefined limit set below the normalized local average pixel intensity value are identified.

If the channel 20 comprises only one adjacent pixel in a channel 20 less than the average predefined limit set below normalized local average pixel intensity value such pixel is deemed to constitute a small contaminant particle 42. If the channel 20 comprises more than one adjacent pixel with a pixel intensity value less than a predefined limit set below the normalized local average pixel intensity value, such pixel is considered to be a medium contaminant particle. Optionally, the method may also include scanning adjacent pixels in a channel 20 for large contaminant particles as well. In a further embodiment of the present invention, the center of contaminant particles, for example, large and medium contaminant particles, may then be calculated. By identifying the center of the contaminant particle, the dimensions and outer edges of the contaminant particle may then be obtained, thereby facilitating easier detection of pixels slightly affected by a contaminant particle. The center of a particle is given by all the pixels less than the predefined limit set below the normalized local average pixel intensity value. In a further embodiment, the edges or outer regions of a contaminant particle may be determined by identifying pixels with pixel intensity values above the predefined limit but less than the normalized local average pixel intensity value.

In another embodiment of the present invention as shown in FIG. 2, a method of compensating for contaminant particles on a calibration strip 10 when collecting calibration data is provided. The method comprises identifying the dimensions of a contaminant particle located during imaging of a scanner calibration strip 10, excluding all pixel intensity values from calibration data which have a pixel intensity value less than a predefined limit set below the normalized local average pixel intensity value due to the pixels at least partially covered by the contaminant particle, and replacing excluded pixels values in the calibration data with interpolated values, wherein the interpolated values are generated by interpolating between pixel intensity values adjacent to the excluded pixel intensity values. For example, if two adjacent pixels in a column are partially covered by a contaminant particle, these pixel intensity values may be excluded in the calibration data and replaced with values generated by interpolating between non-contaminated pixels adjacent to the excluded pixels in a channel. Alternatively, the method may exclude only the portions of pixels covered by the contaminant particle.

The above method may further comprise excluding pixels having pixel intensity values above the predefined limit but less than the normalized local average pixel intensity value. Typically, these excluded pixels are adjacent to the excluded pixels having pixel intensity values less than the predefined limit set below the normalized local average pixel intensity value. These pixels may be partially covered by contaminant particles. Thus excluding these pixels may reduce artificial streaking during scanning.

The method may further comprise computing gain and offset factors for scanner calibration by averaging pixel intensity values in the calibration, wherein the average is calculated utilizing the interpolated values. Subsequently, the scanner may perform scanner calibration with the computed gain and offset, and store the calibration data produced.

The methods of the present invention are operable for all scanner embodiments, including flatbed scanners, sheet fed automatic document feeder scanners, or other scanner types known to one skilled in the art. The scanner embodiments may be stand-alone scanners or multifunction devices having the capability to perform other fuctions, such as printing, copying, and/or faxing, in addition to scanning. Moreover, the methods described herein may be used at various stages of scanner calibration. One such stage occurs when the scanner is initially calibrated to gather calibration strip data. Another stage is regular scanner calibration, wherein the method of the present invention can be used to check calibration data before storage. Yet another implementation may be to periodically monitor scanner contamination, for example, after installation in a customer location.

It is noted that terms like "specifically," "generally" "optionally", "preferably," "typically", "often", and the like are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these aspects.

What is claimed is:

1. A method of identifying the location and dimensions of a contaminant particle on a calibration strip comprising:
   collecting calibration data by imaging a calibration strip comprising a plurality of channels arranged in rows and a plurality of pixel columns, wherein each channel comprises a plurality of horizontally adjacent pixels, and each pixel column comprises pixels from a plurality of channels;
   generating a normalized local average pixel intensity value by the steps of
      selecting a plurality of pixels,
      computing the average intensity value by averaging the intensity values of all selected pixels,
      computing normalized pixel intensity values for each of the selected pixels by dividing each pixel value by the average intensity value, and
      averaging the normalized pixel intensity values to generate the normalized local average pixel intensity value; and
   identifying the number of adjacent pixels in a column with pixel intensity values less than the predefined limit set below the normalized local average pixel intensity value, wherein the number of identified adjacent column pixels with pixel intensity values less than the predefined limit set below the normalized local average pixel intensity value correlates to the dimensions of a contaminant particle on the calibration strip.

2. The method of claim 1, wherein the plurality of channels comprises red channels, green channels and blue channels.

3. The method of claim 1, wherein the plurality of channels further comprises a monochromatic (mono) channel.

4. The method of claim 3, wherein the plurality of channels are normalized to the pixel intensity values of the mono channel.

5. The method of claim 1, wherein imaging the calibration strip comprises illuminating images on the calibration strip and mirroring the illuminated images to a sensor plane through a scanner lens.

6. The method of claim 1, wherein the calibration strip is white.

7. The method of claim 1, wherein the normalized local average pixel intensity value varies depending on the location of the calibration strip.

8. The method of claim 1, wherein the pixel column comprises at least two adjacent pixels having pixel intensity values less than the predefined limit set below the normalized local average pixel intensity value, thereby defining a large contaminant particle.

9. The method of claim 8, further comprising calculating a center of the large contaminant particle.

10. The method of claim 1, wherein the pixel column comprises one pixel having a pixel intensity value less than a predefined limit set below the normalized local average pixel intensity value, thereby defining a small or medium contaminant particle.

11. The method of claim 10, further comprising identifying the number of pixels adjacent to the one pixel in the channel, which comprise a pixel intensity value less than a predefined limit set below the normalized local average pixel intensity value.

12. The method of claim 11, wherein the channel comprises one adjacent pixel having a pixel intensity value less than a predefined limit set below the normalized local average pixel intensity value, thereby defining a small contaminant particle.

13. The method of claim 12, wherein the channel comprises more than one adjacent pixels having pixel intensity value less than a predefined limit set below the normalized local average pixel intensity value, thereby defining a medium contaminant particle.

14. The method of claim 13, further comprising calculating a center of the medium contaminant particle.

15. The method of claim 1 comprising:
   compensating for contaminant particles by excluding from the calibration data pixel intensity values corresponding to contaminant particle locations; and
   replacing excluded pixel intensity values in the calibration data with interpolated values, wherein the interpolated values are generated by interpolating between pixel intensity values adjacent to the excluded pixel intensity values.

16. The method of claim 15, further comprising excluding pixels having pixel intensity values less than the normalized local average pixel intensity value pixel but greater than the predefined limit set below the normalized local average pixel intensity value.

17. The method of claim 16, wherein the excluded pixels having pixel intensity values less than the normalized local average pixel intensity value pixel but greater than the predefined limit set below the normalized local average pixel intensity value are adjacent to the excluded pixels having pixel intensity values less than the predefined limit set below the normalized local average pixel intensity value.

18. The method of claim 15, further comprising computing gain and offset factors for scanner calibration by averaging pixel intensity values including interpolated values in the calibration data.

19. The method of claim 18, further comprising performing scanner calibration with the computed gain and offset.

20. The method of claim 1, wherein the normalized local average pixel intensity value is obtained by
   selecting a region of pixels,
   computing the average intensity value of all pixels in the selected region;
   computing normalized pixel intensity values for each pixel in the selected region by dividing each pixel value by the average intensity value; and
   averaging the normalized pixel intensity values to generate the normalized local average pixel intensity value.

21. The method of claim 1, wherein the selected region is less than the entire calibration strip.

* * * * *